United States Patent
Terörde et al.

(10) Patent No.: US 9,446,391 B2
(45) Date of Patent: Sep. 20, 2016

(54) PROTECTED REDUCED METAL CATALYST

(71) Applicant: BASF Corporation, Florham Park, NJ (US)

(72) Inventors: Robert Johan Andreas Maria Terörde, De Meern (NL); Albertus Jacobus Sandee, De Meern (NL)

(73) Assignee: BASF CORPORATION, Florham Park, NJ (US)

( * ) Notice: Subject to any disclaimer, the term of this patent is extended or adjusted under 35 U.S.C. 154(b) by 20 days.

(21) Appl. No.: 14/365,533

(22) PCT Filed: Dec. 14, 2012

(86) PCT No.: PCT/IB2012/057347
§ 371 (c)(1),
(2) Date: Jun. 13, 2014

(87) PCT Pub. No.: WO2013/088411
PCT Pub. Date: Jun. 20, 2013

(65) Prior Publication Data
US 2014/0336287 A1    Nov. 13, 2014

(30) Foreign Application Priority Data

Dec. 16, 2011 (EP) ..................................... 11194051
Oct. 17, 2012 (EP) ..................................... 12188826

(51) Int. Cl.
| | |
|---|---|
| *B01J 31/06* | (2006.01) |
| *B01J 23/78* | (2006.01) |
| *C10G 2/00* | (2006.01) |
| *C10G 3/00* | (2006.01) |
| *B01J 31/02* | (2006.01) |
| *B01J 37/03* | (2006.01) |
| *B01J 37/16* | (2006.01) |
| *B01J 33/00* | (2006.01) |

(52) U.S. Cl.
CPC ................. *B01J 31/06* (2013.01); *B01J 23/78* (2013.01); *B01J 31/02* (2013.01); *C10G 2/332* (2013.01); *C10G 2/334* (2013.01); *C10G 3/46* (2013.01); *C10G 3/50* (2013.01); *B01J 33/00* (2013.01); *B01J 37/033* (2013.01); *B01J 37/16* (2013.01); *B01J 2231/00* (2013.01); *Y02P 30/20* (2015.11)

(58) Field of Classification Search
CPC .......... B01J 23/78; B01J 31/02; B01J 31/06; B01J 37/033; B01J 37/16; B01J 33/00; B01J 2231/00
USPC .................................................. 502/159, 173
See application file for complete search history.

(56) References Cited

U.S. PATENT DOCUMENTS

| | | | |
|---|---|---|---|
| 4,794,098 A | 12/1988 | Pohl et al. | |
| 5,585,316 A | 12/1996 | Nay et al. | |
| 6,294,498 B1 | 9/2001 | Darcissac | |
| 2001/0047041 A1* | 11/2001 | Lapidus | B01J 29/90 518/715 |

FOREIGN PATENT DOCUMENTS

| | | |
|---|---|---|
| EP | 0 249 849 A2 | 12/1987 |
| EP | 0 572 081 B1 | 12/1993 |
| EP | 2 371 937 A1 | 10/2011 |
| EP | 2 380 953 A1 | 10/2011 |
| GB | 1312963 A | 4/1973 |
| JP | 563 4494 A | 2/1988 |
| JP | H0824665 A | 1/1996 |
| TW | 387483 | 5/2007 |
| TW | 201124202 | 7/2011 |
| WO | 2004/035204 A1 | 4/2004 |

* cited by examiner

*Primary Examiner* — Jafar Parsa
(74) *Attorney, Agent, or Firm* — Lowenstein Sandler LLP

(57) ABSTRACT

The invention relates to a process for producing a protected reduced supported metal catalyst powder, in particular catalysts used in a variety of chemical reactions, such as the hydrogenation of hydrocarbon compounds in petrochemical and oleochemical processes; the hydrogenation of unsaturated fats and oils, and unsaturated hydrocarbon resins; and in the Fischer Tropsch process. This invention also relates to a composition comprising said catalyst and a liquid. In accordance with the invention there is provided a process for preparing a protected, reduced metal catalyst on a support, wherein said supported catalyst is in the form of a powder, which process comprises contacting and mixing said supported catalyst with a liquid in an inert atmosphere and wherein the amount of liquid corresponds to up to five times the amount required for incipient wetness.

12 Claims, 4 Drawing Sheets

PROTECTED REDUCED METAL CATALYST

CROSS REFERENCE TO RELATED APPLICATIONS

This application claims priority from PCT/IB2012/057347 claiming priority from EP 11194051.6 filed Dec. 16, 2011 and EP 12188826.7 filed Oct. 17, 2012, all of which are incorporated herein by reference in their entirety.

BACKGROUND

The invention relates to a process for producing a protected reduced supported metal catalyst powder, in particular catalysts used in a variety of chemical reactions, such as, the hydrogenation of hydrocarbon compounds in petrochemical and oleochemical processes; the hydrogenation of unsaturated fats and oils, and unsaturated hydrocarbon resins; and in the Fischer Tropsch process. This invention also relates to a composition comprising said catalyst and a liquid.

Hydrocarbon resins are produced by oligomerisation or polymerization of hydrocarbon fractions, typically originating from the (catalytic) cracking of crude oil, including petroleum distillates and fractions from naphtha crackers. In order to give the resin the required properties (chemical and physical), they are usually hydrogenated using hydrogenation catalysts. Most commonly nickel catalysts are applied in this process.

Hydrogenation can be used to modify various properties of the hydrocarbon resin. Examples of these modifications include the removal of part or all of the aromatic functionalities, removal of so-called colour bodies (decolorizing the resin from brown or yellow to white), modification of the molecular weight distribution, and removal of impurities, such as sulfur, nitrogen and/or halogen compounds.

Tailor made metal catalysts that fulfill these specific demands include nickel and palladium catalysts, which are generally delivered as reduced metal particles supported on an inorganic support. One such example is a nickel catalyst supported on silica/alumina.

Supported metal catalysts may typically be in the form of porous particles, a porous powder, or shaped as a monolith, a structured packing, tablets, extrudates, or spheres. Often catalysts in the form of a powder are used in the hydrogenation of resins.

However, such powdered catalysts can be pyrophoric or pyrogenic, with self-ignition temperatures typically much lower than room temperature. Such catalysts therefore need to be packed and shipped in a protected and/or stabilized way.

A common method used to stabilize such catalysts is to implement a controlled oxidation step after the reduction of the catalyst, such as described in DE-A-199 09 175. In this step the catalyst is exposed to oxygen in a controlled manner such that, for example, the outer layer of the reduced nickel particle is protected with a small layer of nickel oxide. This stabilization step, however, is time consuming and the resulting product is undesirable as it generally consists of small, dusty and toxic particles. Furthermore, this method only results in a moderate increase of the self ignition temperature.

Shaped catalysts are typically stabilized by immersion in a protective liquid. Upon handling of the protected shaped catalyst, the excess liquid is removed and the shaped catalyst is then loaded into the reactor. Powder catalyst may also be stabilized by this method which would result in a slurry. However, the disadvantage of this method being applied to a powder catalyst is that the powder catalyst tends to settle, which leads to difficulties in handling of the stabilized powder catalyst, in particular when loading into a reactor.

EP-A-0 572 081 describes coating a catalyst powder with a protective grease. The disadvantage of this method is that the grease coating would have to be removed to prevent contamination when used in applications not involving grease. In many applications such contaminations are unacceptable.

WO-A-2004/035204 describes a process for protecting a reduced catalyst powder by dispersion in hardened vegetable oil or fat to produce catalyst flakes or droplets. Again, that method can only be applied if the oil or fat does not contaminate the product.

U.S. Pat. No. 6,294,498 describes a process for protecting a solid catalyst by coating the external surface with a polymer. U.S. Pat. No. 6,294,498 describes that the amount polymer coating should be less than 25% of the weight of the catalyst. Further, that the polymer is applied at a temperature below the crystallization point of the polymer.

JP-A-8 024 665 describes using a non-volatile oil to protect a metal catalyst from deactivation and ignition. Again, the disadvantage of this method is that the protective coating must be removed using additional chemicals This document also describes that this method may be used to produce a paste, which has the disadvantage that it is a less convenient form for shipping and handling.

U.S. Pat. No. 3,453,217 describes protected catalyst particles which have a cylindrical shape. Catalyst powders are not disclosed or suggested.

EP-A-0 249 849 describes protecting a shaped catalyst by impregnation of said catalyst with one or more liquid alcohols under an inert atmosphere.

DETAILED DESCRIPTION

Figure 1:
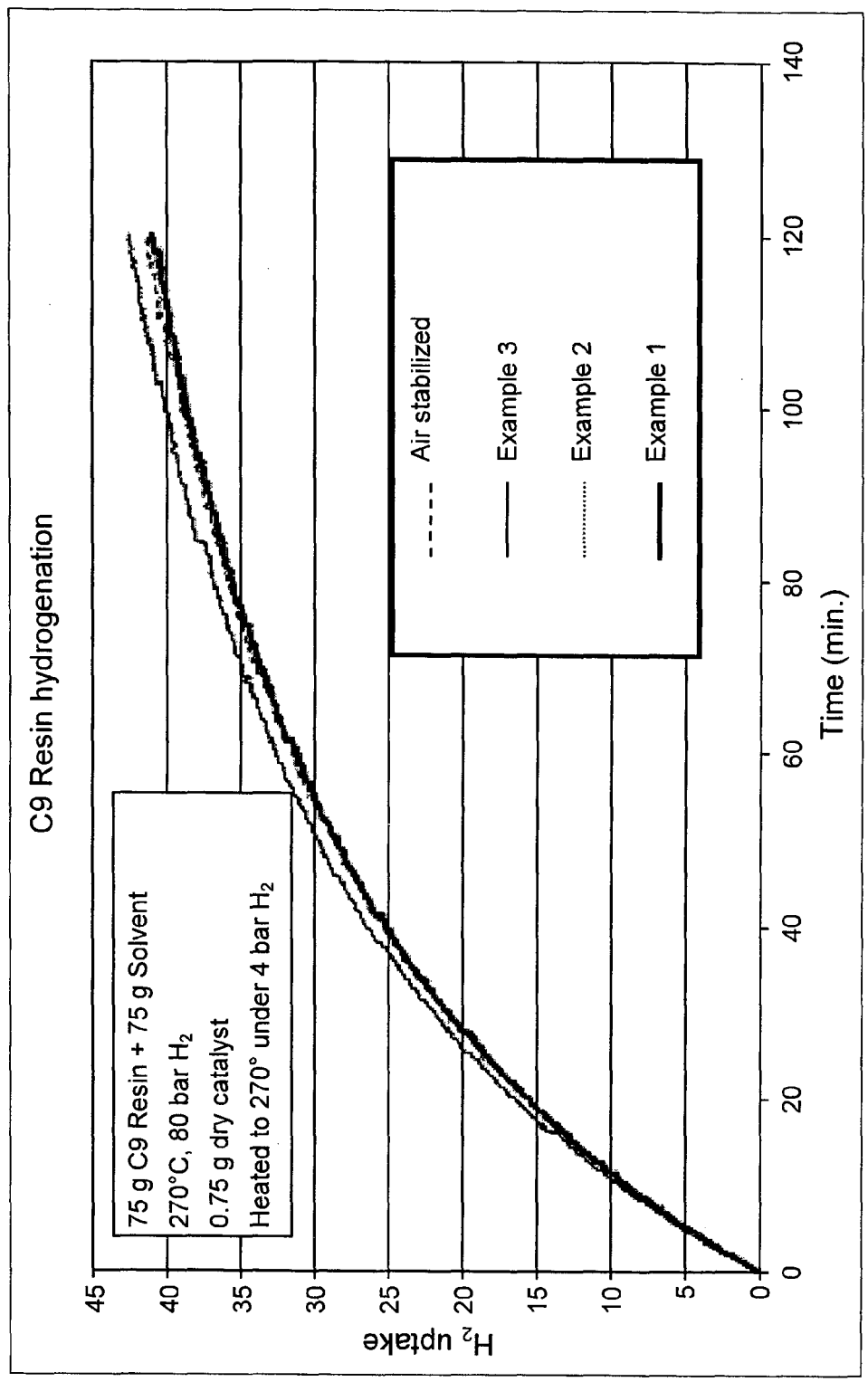
FIG. 1 is plot comparing the activity of inventive examples to that of a conventionally air-stabilized nickel catalyst analogue.

It is an object of the present invention to provide a catalyst powder that is protected in an improved way such that it can be packed, shipped and processed safely and easily, without the risk of a spontaneous ignition and where also the formation of toxic dust particles is avoided. A further advantage of the process of the present invention is that the protective liquid coating can be removed from the catalytic process by distillation.

It was found that this object may be met by a process of contacting and mixing a reduced, supported metal catalyst powder with a specific amount of a liquid.

Accordingly, the present invention is directed to a process for preparing a protected, reduced metal catalyst on a support, wherein said supported catalyst is in the form of a powder, which process comprises contacting and mixing said supported catalyst with a liquid in an inert atmosphere and wherein the amount of liquid corresponds to up to five times the amount required for incipient wetness.

In particular, the process of the invention may be used to protect powder catalysts suitable for hydrogenation.

The mixing is carried out in such a manner that sufficient coverage of the powder particles with the liquid is obtained. The coverage is considered to be sufficient when the powder does not auto-ignite when exposed to air. In general, it is assumed that when the powder does not ignite, substantially the entire surface (e.g. more than 95%) of substantially all the particles (e.g. more than 95%) is covered by the liquid. Mixing may be carried out using common mixing equipment, such as by shaking, using stirrers or rotors, ribbon blender, sonication, and the like.

The amount of liquid typically used is a multiple of the amount of liquid required for incipient wetness. Preferably the amount of liquid is from about 1 to 5 times the amount of liquid required for incipient wetness, more preferably from about 1.3 to 4.5 and most preferably from about 1.5 to 3.5.

Incipient wetness impregnation is a commonly known technique for the synthesis of heterogeneous catalysts from mixing a solid support with a certain quantity of a metal containing liquid. At incipient wetness, the volume of the liquid used for the impregnation is just sufficient to fully "wet" the catalyst; the liquid totally fills the pores of the solid and there is no excess liquid present. Capillary action draws the solution into the pores. The liquid/catalyst ratio for incipient wetness is typically about one equivalent of liquid to two equivalents of catalyst, depending on the pore volume of the catalyst.

Surprisingly we have found that the supported reduced metal catalyst powder can be substantially protected against rapid oxidation by covering the metal surface with a specific quantity of a highly boiling liquid. That quantity is related to the level of incipient wetness. In addition we have found that the degree of reduction of the metal is similar to or slightly better than that of the conventionally stabilized catalyst, particularly for nickel catalysts.

The metal in the catalyst may be selected from the group consisting of nickel, cobalt, platinum, palladium, rhodium, ruthenium, copper, molybdenum and combinations thereof. Preferably, the metal is nickel or cobalt.

The solid catalyst support may be selected from the group consisting of silica, alumina, silica/alumina, titania, zirconia, zeolites, clay materials and combinations thereof. Preferably the solid catalyst support is silica/alumina.

Typically the nickel catalyst may comprise up to 70 wt. % nickel metal based on the weight of the calcined catalyst. The cobalt catalyst may typically comprise up to 40 wt. % cobalt metal based on the weight of the calcined catalyst. Precious metal catalysts may typically comprise up to 5 wt. % of the calcined catalyst.

Suitable liquids are organic liquids. Preferably said liquid is selected from the group of organic liquids, which typically have a flash point of >40° C. and a boiling point of <300° C., and more preferably have a flash point of >45° C., and a boiling point of less than 250° C. Also suitable as a liquid is water, as well as combinations of water and organic liquids However, water or combinations of organic liquids and water are less preferred since water is a contaminant in many reactions, especially those carried out in organic media. In particular when it is applied in the amount envisaged by the present invention. Typically the heat capacity of the liquid used is >1.5 kJ/kg·K.

Preferably the liquid is selected from the group consisting of C10-C13 aliphatic hydrocarbon liquids, hydrodesulfurized heavy naphtha, white spirits, tetralin, aromatics, ester, ethers and combinations thereof.

The advantage of using such liquids is that they may be removed by evaporation, in particular distillation and/or are inherently harmless to the product of the reaction in which the catalyst is used. As a result, no additional chemical impurities will be introduced when the catalyst is used in catalytic processes.

The term inert atmosphere is understood to be an atmosphere comprising ≤5 mass % of oxygen. Preferably the inert atmosphere comprises nitrogen gas or argon.

It was found that such a protected catalyst produced by the process of the present invention is surprisingly stable towards spontaneous ignition and also adequately prevents the formation of dust. This is beneficial in the dosing and application of the protected catalyst in processes. A further advantage is that the catalyst, protected with the process of the present invention, causes little contamination in the process in which it is used. It is of further advantage that neither the activity nor selectivity of the catalyst is compromised by the protection process. The present process is also advantageous in that it is less time consuming and economically more feasible than current methods. Furthermore, such a protected catalyst may more readily be handled and transported than catalyst protected by conventional methods.

Surprisingly it was found that the self-ignition temperature of a supported nickel catalyst powder could be increased from 65° C., when stabilized via the conventional way, to up to about 177° C., when protected according to the process of the present invention by using an organic liquid.

It is quite surprising that the process of the present invention provides more stable supported metal catalyst powder products compared to those produced by the commonly used air stabilized method. It is more surprising that this may be accomplished by using an organic liquid which is in itself flammable, and it is most surprising that using an amount of liquid corresponding to up to five times the amount required for incipient wetness is sufficient to protect the catalyst.

Without wishing to be bound by theory it is believed that the liquid ensures that the protected, reduced metal catalyst powder does not ignite spontaneously in air at ambient temperature. It is thought to be due to two reasons; 1) protection of the reduced metal powder against rapid oxidation due to the organic liquid controlling oxygen diffusion through the liquid to the catalyst, and 2) the compensation of the formation of heat due to the heat capacity of the protecting liquid.

Thus, the protected catalyst of the invention comprises a support on which are present metal particles that comprise a core of reduced metal, and on the surface of these metal particles may there be present a layer of metal oxide. The protected catalyst of the invention further has substantially the entire surface (e.g. more than 95%) of substantially all the metal particles (e.g. more than 95%) covered by the liquid.

The advantage of using the protected catalyst according to the invention is that when the catalyst is actually used, viz. by subsequent contact of the protected catalyst with reagents in a solvent, the liquid protecting the catalyst may be easily distilled off.

In another embodiment, the process of the invention further comprises contacting and mixing the reduced supported metal catalyst powder with a liquid in an inert atmosphere to produce a slurry and then reducing the amount of liquid in the slurry so that the amount of liquid is from 1 to 5 times the amount of liquid required for incipient wetness.

Preferably, the liquid amount may be decreased by filtration, centrifugation and/or evaporation.

The catalyst, protected as described herein above, may be suitably used for reduction or hydrogenation processes such as hydrogenation reactions on hydrocarbon compounds in petrochemical and oleochemical processes; such as the hydrogenation of unsaturated fats and oils, and unsaturated hydrocarbon resins; and in the Fischer Tropsch process.

The present invention is also directed to a paste or a granule comprising a reduced supported metal catalyst powder and a liquid, which is obtainable by the process according to the present invention.

A granule is defined herein as a compact, aggregate particle comprising small particles of a substance.

The advantage of the protected catalyst powder being in the form of either a granule or a paste over conventionally protected catalyst powders, which are typically in the form of slurries, is that granules and pastes, in particular granules, are more readily useable, require less processing before use (no settling occurs) and are easier to handle and transport than slurries.

The present invention is now elucidated on the basis of the following non-limiting examples.

EXAMPLES

Reduced powdered nickel catalysts were prepared according to those reported in WO-A-01/36093. Typically, solutions containing nickel and magnesium salts, silicate and sodium carbonate were mixed in a well stirred precipitation vessel at a temperature of 80° C. The pH of the slurry formed was about 7.5 and after 1 hour the precipitation was completed. After washing the precipitate, the precursor of the catalyst was filtered and dried in an oven at 110° C. The catalyst was activated with hydrogen. The resulting reduced powdered nickel catalyst has a nickel content of 62 wt. %, an $SiO_2$ content of 11 wt. % and a magnesium content of 2.8 wt. %.

Example 1

Preparation of 4.1 times incipient wetness wetted catalyst mixture using C10-C13 liquid. 20 g of the reduced nickel catalyst prepared as described above was mixed with the defined amount of C10-C13 liquid in a nitrogen containing glovebox. The mixing was taking place by gentle rotating in a round bottom flask of 250 ml for 30 minutes. After that, the mixture was captured in a sample vial and the sample was exposed to air. The resulting sample did not ignite and was obtained as a wet paste which was difficult to handle. The degree of reduction (percentage of reduced metal) of this sample was 60.4%.

Example 2

Preparation of 2.7 times incipient wetness wetted catalyst mixture using C10-C13 liquid. 20 g of reduced nickel catalyst was mixed with the defined amount of C10-C13 liquid in a nitrogen containing glovebox. The mixing took place by gentle rotating in a round bottom flask of 250 ml for 30 minutes. After that, the mixture was captured in a sample vial and the sample was exposed to air. This gave rise to a small and controlled temperature increase. After cooling down, the resulting sample was obtained as a stable and easy to handle granular mixture containing large lumps. The degree of reduction of this sample was 54.6%.

Example 3

Preparation of 2.1 times incipient wetness wetted catalyst mixture using C10-C13 liquid. 20 g of reduced nickel catalyst was mixed with the defined amount of C10-C13 liquid in a nitrogen containing glovebox. The mixing took place by gentle rotating in a round bottom flask of 250 ml for 30 minutes. After that, the mixture was captured in a sample vial and the sample was exposed to air. This gave rise to a small and controlled temperature increase. After cooling down, the resulting sample was obtained as a stable, non dusty, granular mixture that was easy to handle. The degree of reduction of this sample was 52.3%.

Example 4

Preparation of 2.3 times incipient wetness wetted catalyst mixture using C10-C13 liquid. 20 g of reduced nickel catalyst was mixed with the defined amount of C10-C13 liquid in a nitrogen containing glovebox. The mixing took place by gentle rotating in a round bottom flask of 250 ml for 30 minutes. After that, the mixture was captured in a sample vial and the sample was exposed to air. This gave rise to a small and controlled temperature increase. After cooling down, the resulting sample was obtained as a stable, non dusty, granular mixture containing small lumps which was easy to handle.

Example 5

Preparation of 4.8 times incipient wetness wetted catalyst mixture using Exxsol D40 (a dearomatized hydrocarbon fluid with a typical aromatic content below 1%, having a boiling range of 234-267° C. and a flash point of 103° C. obtainable from Exxon Mobile). 20 g of reduced nickel catalyst was mixed with the defined amount of Exxsol D40 (a dearomatized hydrocarbon fluid with a typical aromatic content below 1%, having a boiling range of 234-267° C. and a flash point of 103° C. obtainable from Exxon Mobile) in a nitrogen containing glovebox. The mixing was carried out by gentle rotating in a round bottom flask of 250 ml for 30 minutes. After that, the mixture was captured in a sample vial and the sample was exposed to air. The resulting sample was obtained as a stable wet paste which was difficult to handle. The degree of reduction of this sample was 72.6%.

Example 6

Preparation of 3.2 times incipient wetness wetted catalyst mixture using Exxsol D40. 20 g of reduced nickel catalyst was mixed with the defined amount of Exxsol D40 liquid in a nitrogen containing glovebox. The mixing took place by gentle rotating in a round bottom flask of 250 ml for 30 minutes. After that, the mixture was captured in a sample vial and the sample was exposed to air. This gave rise to a small and controlled temperature increase. After cooling down, the resulting sample was obtained as a stable and easy to handle granular mixture containing lumps. The degree of reduction of this sample was 65.8%.

Example 7

Preparation of 2.4 times incipient wetness wetted catalyst mixture using Exxsol D40. 20 g of reduced nickel catalyst was mixed with the defined amount of Exxsol D40 liquid in a nitrogen containing glovebox. The mixing took place by gentle rotating in a round bottom flask of 250 ml for 30 minutes. After that, the mixture was captured in a sample vial and the sample was exposed to air. This gave rise to a small and controlled temperature increase. After cooling down, the resulting sample was obtained as a stable, granular mixture containing small lumps which was easy to handle. The degree of reduction of this sample was 54.3%.

Example 8

20 g of reduced nickel catalyst was mixed for a few minutes with 130 ml of Exxsol D40 liquid in a nitrogen containing glovebox using a spoon. The resulting wet slurry was removed from the glovebox and the excess of liquid was removed by means of filtration. The resulting filter cake was collected in a sample vial as a paste. For further drying, the sample was subjected to reduced pressure. As such a stable and easy to handle catalyst was obtained.

Example 9

Preparation of 1.6 times incipient wetness wetted catalyst mixture using Exxsol D40 by mixing in a 10L Ribbon blender. 900 g of reduced nickel catalyst was charged in the ribbon blender under inert atmosphere. Next, the defined amount of Exxsol D40 liquid was sprayed into the mixer while gently mixing the catalyst powder. After that, air was allowed into the reactor and the reactor content was mixed until the oxidation process was finished. The resulting mixture was obtained as a stable, granular, non dusty mixture containing hardly any lumps. Importantly, the resulting material showed no caking behavior.

Example 10

Comparative 20 g of freshly reduced nickel catalyst was placed in a tube furnace reactor and subjected to a flow of N2 of 60 dm$^3$/hr until a temperature of 60° C. was reached. Then the N2 flow was adjusted to 175 dm$^3$/hr plus 4.5 dm$^3$/hr of air (resulting in an oxygen content of 0.5 vol. % in the stabilization gas). Upon a slow dropping of the bed temperature, gradually, the N2 flow was decreased to 100 dm$^3$/hr (resulting in a final oxygen content in the stabilization gas of 1.2 vol. %). The resulting situation was kept steady during a period of 18 hours. After a short flush with 100% air for an additional 2 hours the sample was collected as a dusty fine powder. The degree of reduction of this comparative sample was 55.3%.

Example 11

Activity curves for examples 1-3 versus that of the conventionally air-stabilized nickel catalyst analogue are shown in FIG. 1. Activity curves were recorded as hydrogen gas uptake curves under the following conditions: 0.75 g of catalyst (based on the dry weight) was added to a mixture of 75 g of C9-resin and 75 g of Exxsol D40 liquid. The resulting suspension was mixed and brought to a temperature of 270° C. under an atmosphere of 4 bar of H$_2$. When the temperature of 270° C. was reached, the hydrogen pressure was increased to 80 bar and the recording of hydrogen gas uptake was started.

From FIG. 1 it is clear that the activity of the liquid protected catalysts is comparable to that of the air stabilized analogue.

Example 12

Self Ignition Point Analyses

Figure 2:
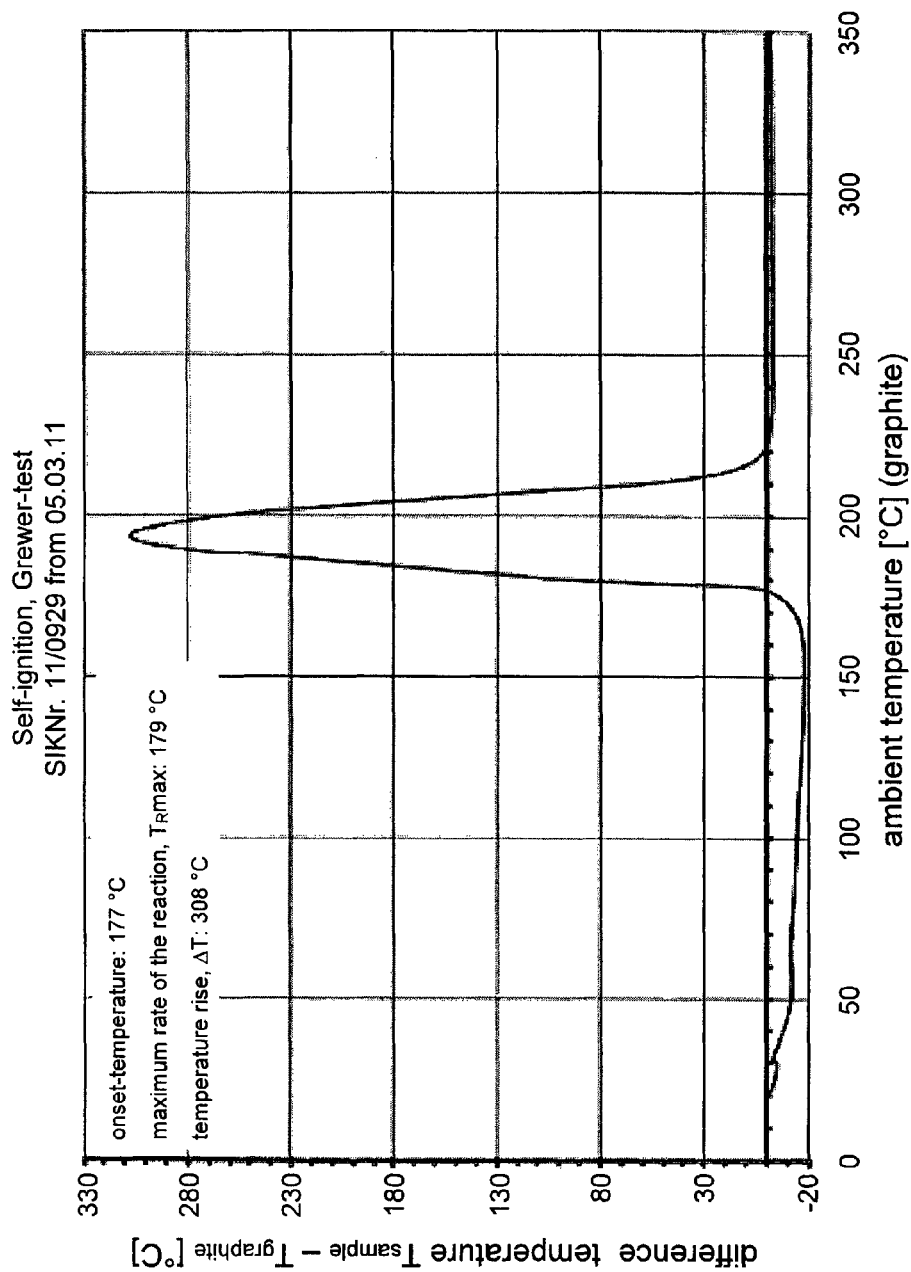
FIG. 2 is a thermostability plot of a sample produced in accordance with an inventive example.

Several samples were subjected to the Grewer test to investigate the temperature of self ignition (a measure of the thermostability of the sample). For the sample prepared in accordance to example 4, the onset of the self-ignition test was found to be at a temperature of about 177° C., as shown in FIG. 2.

Figure 3:
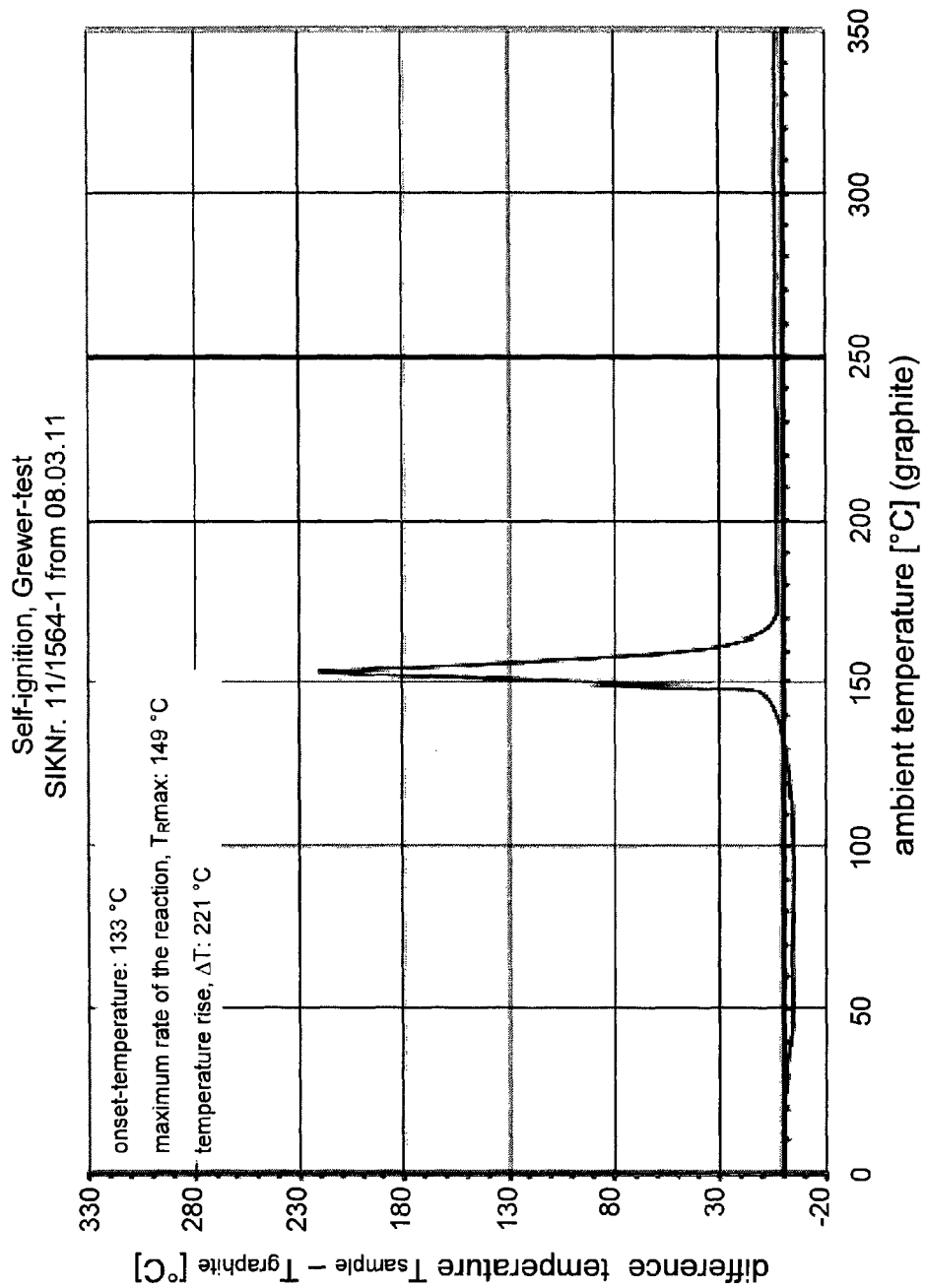
FIG. 3 is a thermostability plot of a sample produced in accordance with another inventive example.

For the sample prepared in Example 7, the onset of the self-ignition was found to be at a temperature of about 133° C., as shown in FIG. 3.

Figure 4:
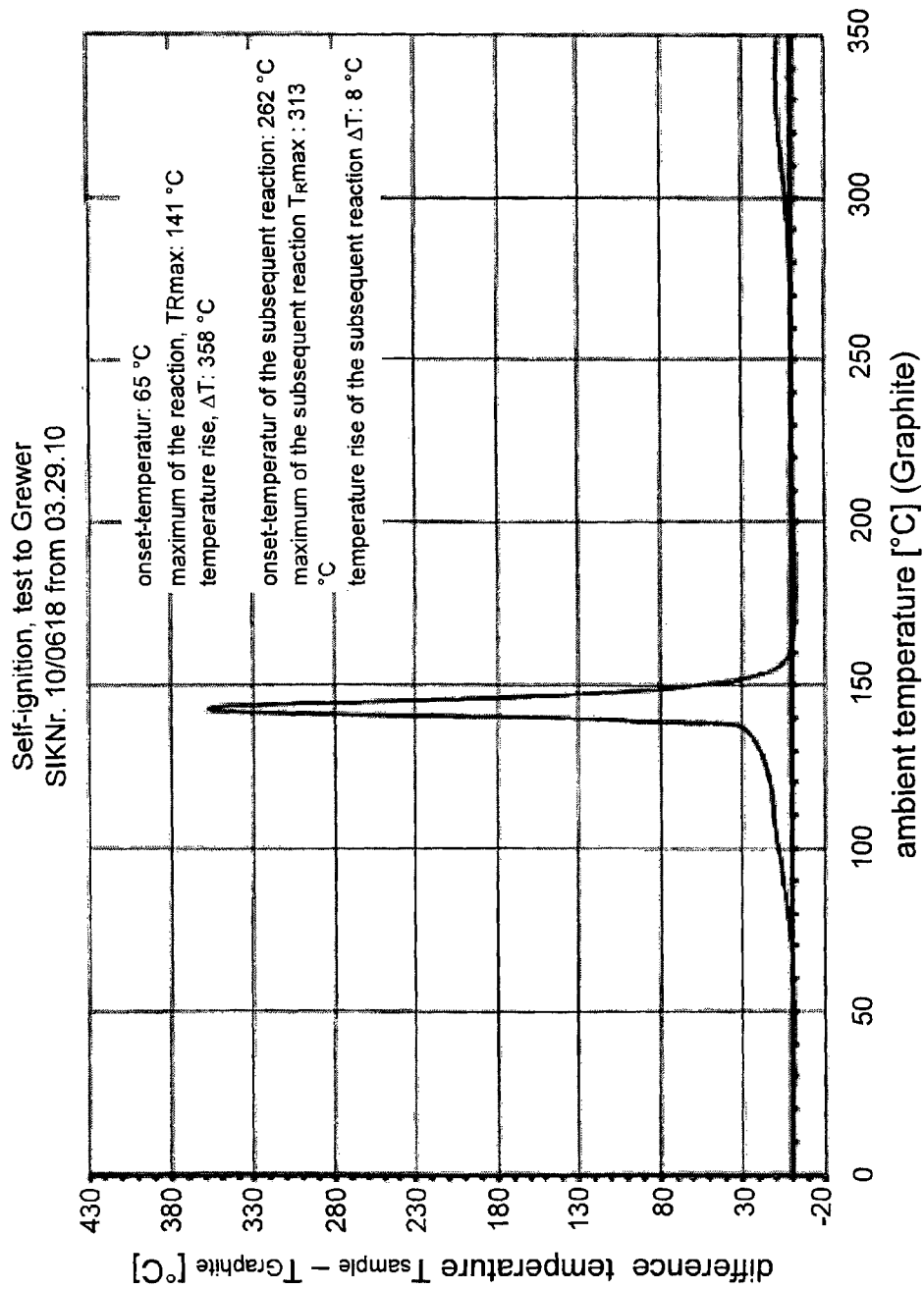
FIG. 4 is a thermostability plot of a sample produced in accordance with a comparative example.

For reasons of comparison, the self-ignition test was also applied to the conventionally air stabilized analogue. The onset of the self-ignition for the reference material was 65° C., as shown in FIG. 4. This demonstrated the strong stabilizing effect of the liquids used for sample coating in the process according to the present invention.

The invention claimed is:

1. A process for preparing a protected reduced metal catalyst on a support, wherein said supported catalyst is in a form of powder particles the process comprising:
   contacting and mixing said reduced, supported metal catalyst powder particles with a liquid in an inert atmosphere;
   covering substantially an entire surface of substantially all the powder particles with the liquid,
   wherein the liquid is present in an amount of up to five times of an amount of liquid required for incipient wetness, and
   wherein said liquid is selected from the group consisting of C10-C13 aliphatic hydrocarbon liquids, hydrodesulfurized heavy naphtha, white spirits, tetralin and combinations thereof.

2. The process according to claim 1, wherein the liquid is present in an amount ranging from 1 to 5 times the amount of liquid required for incipient wetness.

3. The process according to claim 1, further comprising:
   contacting and mixing said supported catalyst with an amount of liquid in an inert atmosphere to produce a slurry; and
   reducing the amount of liquid in the slurry to an amount of liquid ranging from 1 to 5 times the amount of liquid required for incipient wetness.

4. The process according to claim 1, wherein the liquid is present in an amount ranging from 1.3 to 4.5 times the amount of liquid required for incipient wetness.

5. The process according to claim 4, wherein the liquid is present in an amount ranging from 1.5 to 3.5 times the amount of liquid required for incipient wetness.

6. The process according to claim 1, wherein the metal of the supported catalyst is selected from the group consisting of nickel, cobalt, platinum, palladium, rhodium, ruthenium, copper, molybdenum and combinations thereof.

7. The process according to claim 6, wherein said metal is selected from the group consisting of nickel and cobalt.

8. The process according to claim 1, wherein the support is selected from the group consisting of silica, alumina, silica/alumina, titania, zirconia, zeolites, clay materials and combinations thereof.

9. The process according to claim 1, wherein the supported catalyst powder particles are used in a hydrogenation reaction.

10. The process according to claim 9, wherein said hydrogenation reaction comprises the hydrogenation of unsaturated fats, oils, and/or hydrocarbon resins.

11. The process according to claim 1, wherein mixing the supported catalyst powder particles with liquid form a paste.

12. The process according to claim 1, wherein mixing the supported catalyst powder particles with liquid form a granule.

* * * * *